Figure 1:
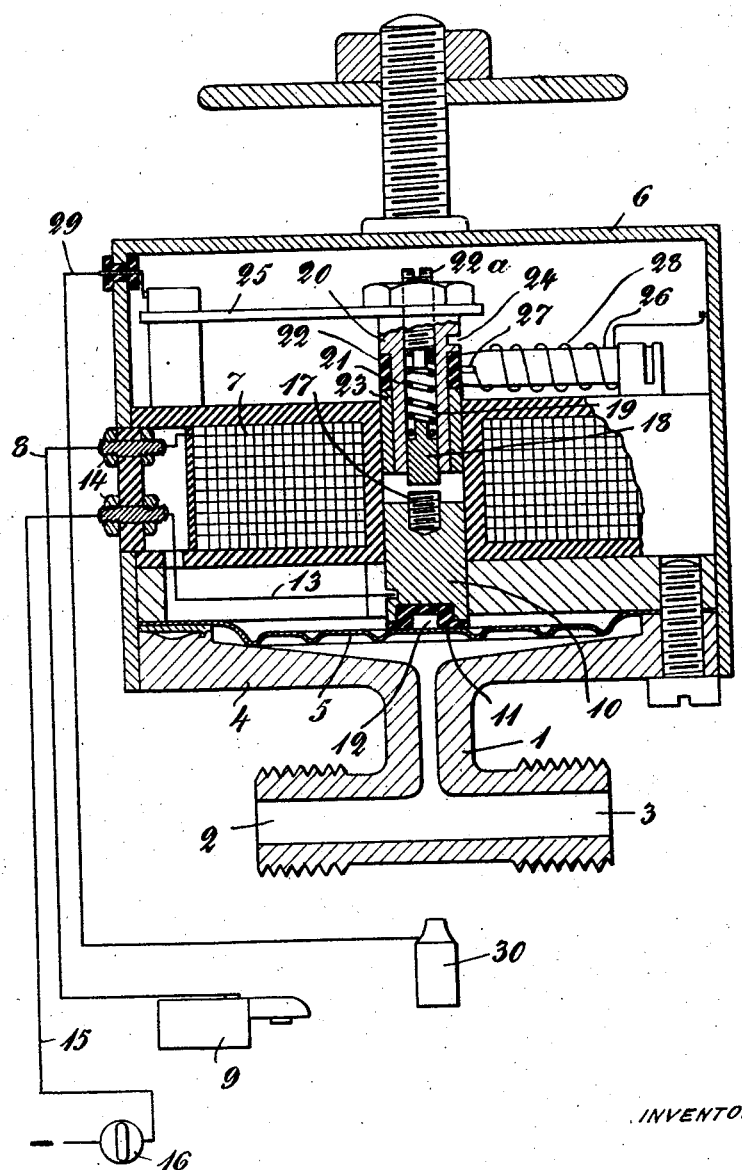

Aug. 6, 1940.  H. SCHIROKAUER  2,210,044
PRESSURE CONTROL APPARATUS
Filed Dec. 27, 1937  6 Sheets-Sheet 1

INVENTOR
Heinz Schirokauer
BY
ATTORNEYS.

Aug. 6, 1940.   H. SCHIROKAUER   2,210,044

PRESSURE CONTROL APPARATUS

Filed Dec. 27, 1937   6 Sheets-Sheet 3

*Fig. 3.*

Aug. 6, 1940. H. SCHIROKAUER 2,210,044
PRESSURE CONTROL APPARATUS
Filed Dec. 27, 1937 6 Sheets-Sheet 4
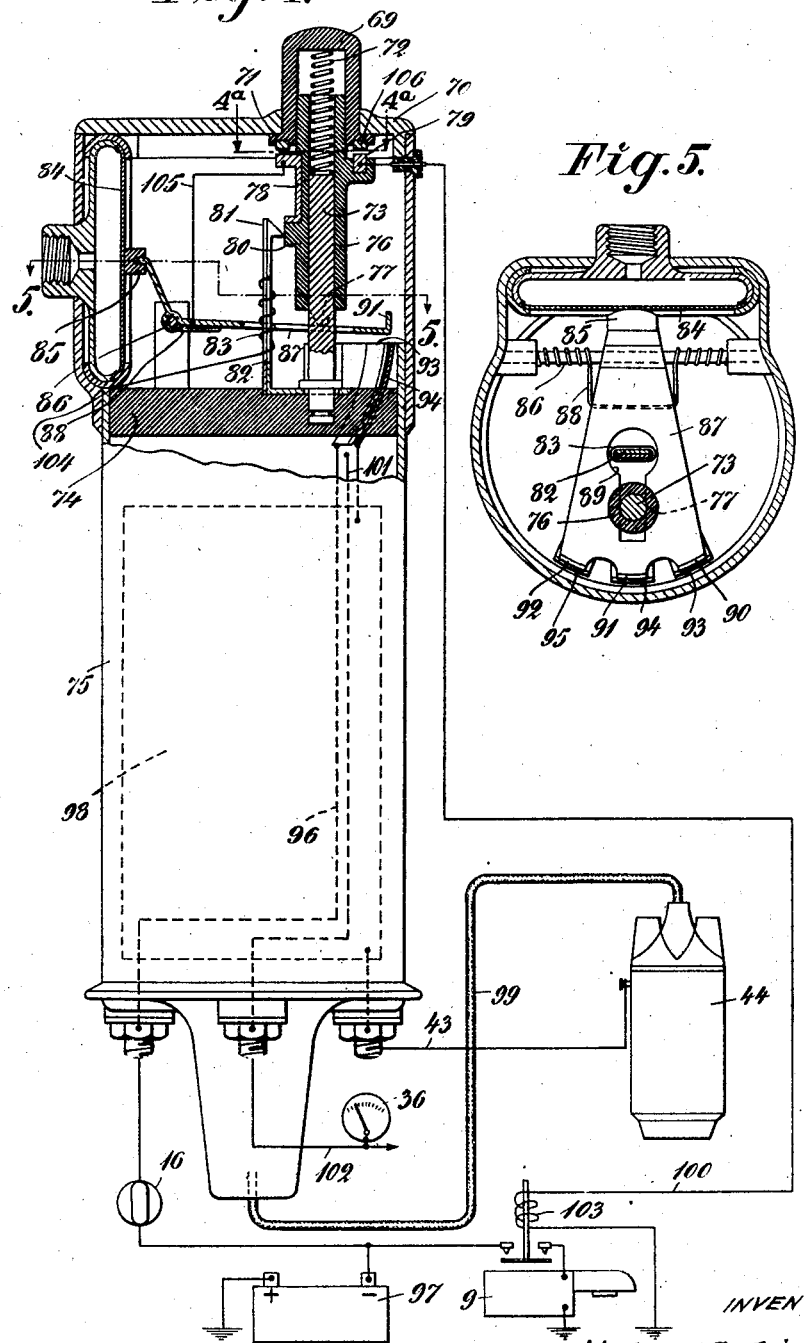
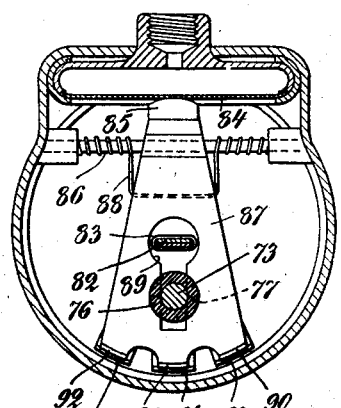
INVENTOR
Heinz Schirokauer
BY
ATTORNEYS Aug. 6, 1940.   H. SCHIROKAUER   2,210,044
PRESSURE CONTROL APPARATUS
Filed Dec. 27, 1937   6 Sheets-Sheet 5
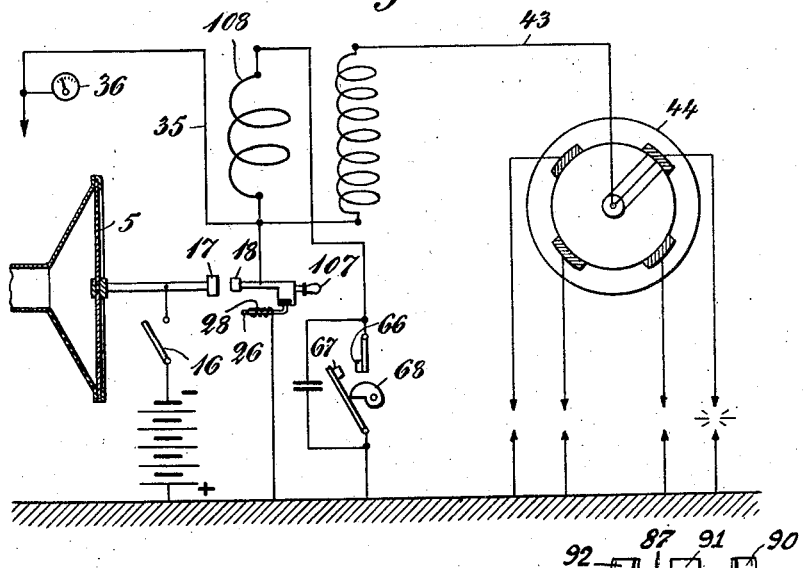
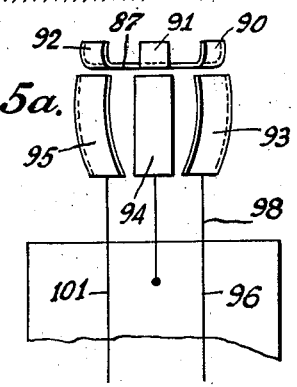
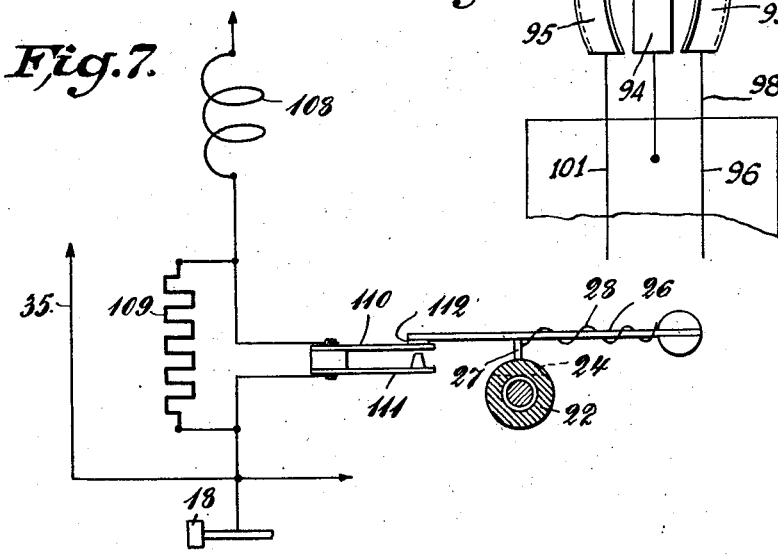
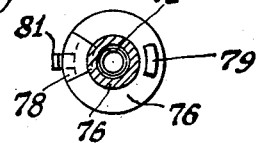
INVENTOR
Heinz Schirokauer
BY
Burnes Harding
ATTORNEYS.

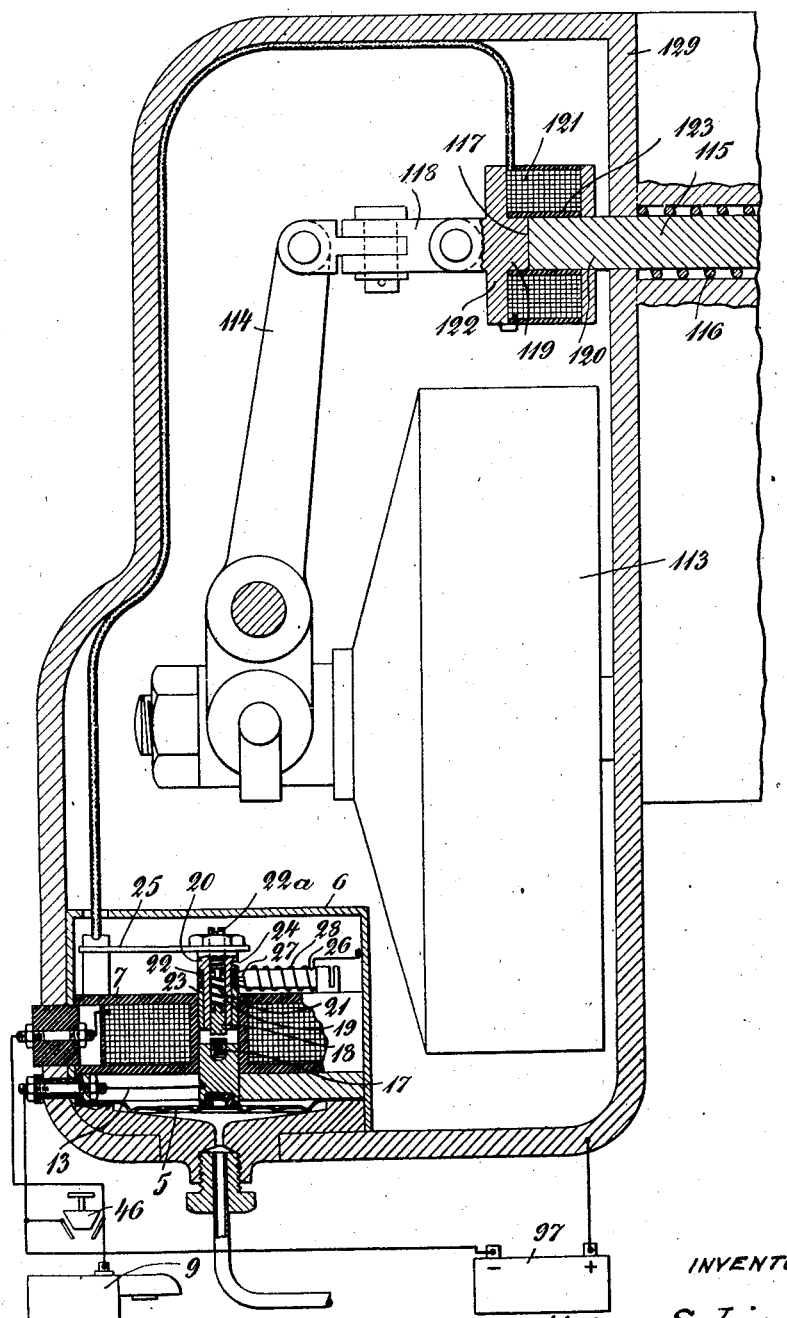

Patented Aug. 6, 1940

2,210,044

UNITED STATES PATENT OFFICE 2,210,044

PRESSURE CONTROL APPARATUS

Heinz Schirokauer, Stockholm, Sweden, assignor to Gunnar Mannheimer, Skuruborg, Ektorp, Sweden Application December 27, 1937, Serial No. 182,009
In Sweden January 30, 1937

20 Claims. (Cl. 123—198)

The present invention refers to machines or engines, such as internal combustion engines, provided with a starting device, and has for its object to avoid injury to the machine or engine on failure of the pressure of certain fluids, such as lubricating oil, cooling water or cooling air, that in normal operation are supplied under pressure and the failure of which will entail risks after the lapse of a certain running period.

In such machines or engines there is generally a member of vital importance for the supply of motive power, for instance in an internal combustion engine with electric ignition the ignition circuit or in a Diesel engine the fuel pump. It has been previously proposed to provide an operating device, such as a membrane-controlled switch, responsive to the fluid pressure so that a sufficient pressure will keep said vital member operative whereas an insufficient pressure will make the member inoperative so that the machine or engine comes to rest. The invention has inter alia for its object, particularly in the case of motor cars, to bridge over the starting period so as to preclude that the lubricating oil pressure, being insufficient during the starting of the engine, should impede the action of the ignition circuit, without thereby incurring any risks for the proper operation of the engine.

The essential feature of the invention consists in that an auxiliary device renders the vital member operative at the starting moment before the fluid pressure has attained its requisite value, whereas a timing device maintains, independently of the operating device, the vital member operative during a period of time which, on the one hand, is such that at a normal supply of fluid and a normal starting up process the pressure will have sufficient time to reach the predetermined pressure limit, and which, on the other hand, will not exceed a period of insufficient pressure, admitted as non-detrimental.

The invention will be more closely described with reference to the accompanying drawings, and in conjunction therewith also further features of the invention will be disclosed.

Figure 2:
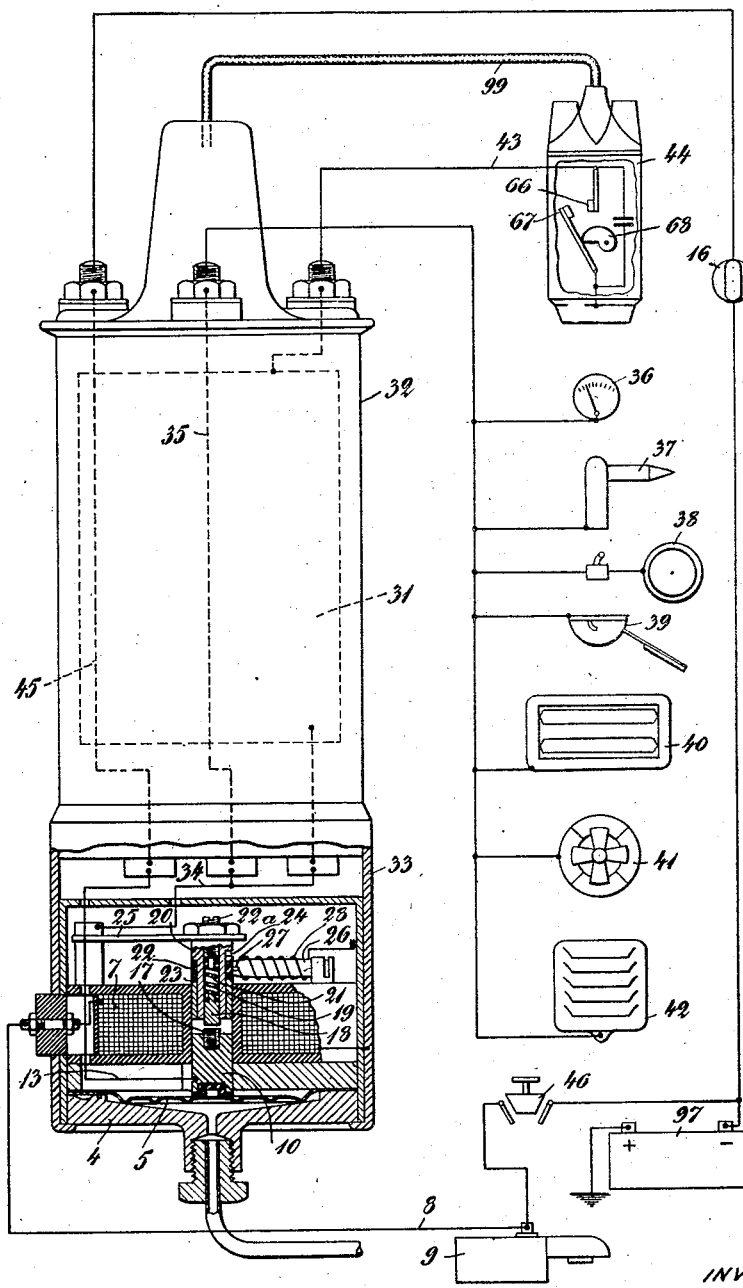

In the drawings,

Figure 1 is a transverse section of an arrangement according to one embodiment of the invention, Figure 2 illustrates the invention as applied to an ignition coil and other electrically controlled accessories normally included in a motor car, Figure 3 illustrates the invention as applied to an ignition coil combined with a magneto, Figure 4 shows a modified realisation of the invention as applied to a manually operated member, Figure 4a is a sectional view on line 4a—4a, Figure 4, whereas Figure 5 is a section taken along the line 5—5 in Figure 4, Figure 5a is an elevation showing details of the construction shown in Figures 4 and 5, Figures 6 and 7 show circuit diagrams according to modified realisations in connection with ignition coils, and Figure 8 shows, in section, an arrangement according to the invention as applied to Diesel engines.

The arrangement shown in Figure 1 is provided with a T-tube 1, the two branches 2 and 3 of which are intended to be included in a piping for oil under pressure of an internal combustion engine, for example appertaining to a motor car. The tube 1 is at its top in the shape of a lamelliform box 4, the upper side of which is covered by a membrane 5. The box 4 is surrounded by an outer casing 6 in which the electrical operating device is contained. Said device consists of a solenoid 7, one terminal of which is connected via a wire 8 to an electrical starting device 9 of the engine, the other terminal (not shown) being associated with the casing 6. A soft iron core 10 is slidable within the solenoid, the lower end of said core being, through the intermedium of an insulating separator 11, fastened to a pin 12 which is fixed to the membrane 5. The core 10 is connected, via a wire 13, a leading-through insulator 14 and a wire 15, to an ignition switch 16 which in closed position connects the negative pole of the battery with an electrical ignition device 30 of the engine. On the core 10 there is provided a contact piece 17. This latter cooperates with a contact piece 18 slidable in a cavity 19 provided in an iron sleeve designed to form an armature 20. The contact piece 18 is suspended on a helical spring 21, the upper end of which is fixed to a set screw 22a. By turning the set screw 22a the contact piece 18 may obviously be elastically set to different initial positions relative to the contact piece 17. The armature 20 is surrounded by an insulating ring 22 which is retained in place by a lower sleeve 23 provided on the armature. Immediately above the insulating ring 22 there is provided a recess 24. The armature 20 is suspended in a leaf spring 25 which, when the solenoid is without current, maintains the armature in the initial position shown in the figure. The leaf spring 25 is connected, via a wire 29, to the ignition device 30.

A bimetallic or thermostat member 26 is rigidly mounted at its one end, whereas its other end is movable, under the influence of temperature variations, in a plane perpendicular to the axis of the solenoid. The free end of the thermostat member has a small projection 27 and when the armature is in its depressed position, this projection is intended to come into locking engagement with the recess 24 in the armature.

The arrangement operates in the following manner.

When the engine is to be started, the ignition switch 16 is first closed, so that the negative pole of the battery is connected, via the wire 15, the insulator 14, the wire 13 and the core 10, to the contact piece 17. When thereupon the starting pedal 9 is actuated, a branch circuit is closed through the wire 8 and the solenoid 7 to the body or frame, thereby causing the solenoid to be current-carrying and to attract the armature 20 against the action of the spring 25. Upon reaching its attracted operative position the projection 27 snaps into the opening 24 and retains the armature in its said position. At the same time, the contact piece 18 has been brought into elastic contact with the contact piece 17 so that the current path from the negative pole of the battery now continues through the contact piece 18, the armature 20 and then, on the one hand, through the recess 24, the projection 27, and a heating winding 28 to the casing 6 and on the other hand, through the spring 25 and the wire 29 to the ignition device 30.

Two different processes are now possible.

*Case 1*

Due to the starting of the engine the oil pressure in the conduit 2, 3 is built up so that the membrane 5 is bent somewhat upwards, and the pressure finally attains a predetermined minimum value. In the meantime, the current passing through the heating winding 28 has heated the thermostat member 26 so that the latter tends to pull the projection 27 out of the recess 24 so as to release the armature. The heating period of the thermostat is assumed to be determined in such a manner as to be somewhat longer than the normal period for building-up the fixed minimum pressure of the lubricating oil so that the release of the armature occurs only after said pressure has been reached. Already long before that time the current from the starting device 9 has ceased, the armature 20 may thereafter return freely to the initial position shown on the drawings, the tension of the spring 21 being assumed to be so chosen or the adjusting screw 22a to be set in such a way that, as long as the pressure on the membrane 5 is equal to or exceeds a prescribed value, electric contact between the contact pieces 17 and 18 will be maintained also in the initial position of the armature, whereby the current path through the core 20, the spring 25, the wire 29 and the ignition device 30 remains included in circuit.

*Case 2*

The oil pressure does not rise sufficiently due to default of start or insufficient oil feed or other faulty circumstance. After the lapse of the fixed releasing period the thermostat 26 leaves its locking engagement and the armature 20 returns to its initial position. Since, as mentioned above, the oil pressure is insufficient, the contact 17 will be positioned somewhat lower than the position indicated in Case 1, so that for a correct adjustment of the contact piece 18 an interspace is formed between the contact pieces 17 and 18 and the current supply to the ignition device 30 interrupted, whereby the engine automatically comes to rest.

Hereby is prevented seizing in the engine due to insufficient oil supply. At an unsuccessful starting the battery will not be unduly discharged in case the operator forgets to open the ignition switch 16.

In the embodiment shown in Figure 2, the invention is assumed to be applied to an ignition coil 31 which is enclosed in a casing 32, for example of cylindrical shape. Said casing is structurally associated with a casing 33 enclosing switching means of the design described in connection with Figure 1, yet modified in the following respects. Via a wire 34 the spring 25 is connected with a through wire 35 extending to a number of accessories normally present in motor vehicles, such as a petrol gauge 36, direction indicators 37, a stop signal 38, a windshield cleaner 39, a sight or anti-frost pane 40, a ventilator 41, a heating element 42, etc. Moreover, the wire 34 is connected with one end of the primary winding of the ignition coil 31, the other end of which is earthed via a wire 43 and a make-and-break contact 66, 67 known per se and actuated by a cam member 68 in timed relation to the rotation of the engine so that the primary circuit from the battery 97 is periodically interrupted and thus induces high tension currents in the secondary circuit of the ignition coil. One terminal of the latter coil may be connected with the primary circuit, whereas its other pole is connected through a wire 99 with a distributor 44. The latter distributes in a manner known per se the high-voltage impulses to the spark plugs provided in the cylinders of the engine. The wire 13 has been extended upwards within the casing 33 and is connected to a through wire 45 which is associated, via the ignition switch 16, with the negative pole of the battery 97. The starting device 9 is connected, via a pedal controlled switch 46, with the negative pole of the battery 97.

In this circuit arrangement there is not included in the primary circuit of the ignition coil any series resistance otherwise often employed in circuits of this kind. Said primary circuit may, therefore, during the operation of the engine be passed by a current, the instantaneous value of which exceeds considerably the highest permissible value that could be permitted in the case of continuedly closed make-and-break contacts 66, 67, which occurs, for example, if in an ordinary motor vehicle having no control devices according to the present invention, the driver stops the engine and forgets to open the ignition circuit and the make-and-break contacts then occupy their closed position. Such a permanent state can never occur according to the present invention, since upon the stopping of the engine the oil pressure falls and the membrane 5 displaces the member 10 downwards so that the contacts 17, 18 are opened and the primary circuit of the ignition coil 31 interrupted. Due to this preventive measure, the primary circuit may thus be adapted to present the same total, comparatively low resistance during the starting period as in normal operation.

In the embodiment indicated in Figure 3 there is fixed to the membrane 47 a rod 48 provided at its upper end with a flange 49. The latter is maintained in depressed position by means of a spring 50. Slidably arranged on the rod 48 is an armature 51 which cooperates with a sleeve 52 likewise slidable on the rod 48. The armature 51 cooperates magnetically with a stationary iron core 126. At its upper end the sleeve is somewhat widened and provided with an insulating ring 53 cooperating with a contact point 54 which is fastened to a bimetallic member 55 and connected with one terminal of the heating winding 56 thereof. Accommodated on the rod 48 is a contact arm 57 the right hand end of which is provided with an aperture and fitted on an insulated pin 58. The interior of said pin is made of metal and designed to form a flange 59 which in the position shown in the figure makes contact with the arm 57 and connects the latter with the terminal 60 and the magneto 61. The opposite end of the contact arm 57 is fitted with a contact piece 62 insulated from the arm, said piece being by means of a flexible conductor 63 connected to the primary circuit of the ignition coil and the through wire 35. The movable contact piece 62 cooperates with a fixed contact piece 64 which is connected both with the through wire 45 and the right hand terminal of the heating winding 56.

The arrangement operates in the following manner. When the starting contact 46 is closed and the starting device 9 commences operation, the coil 7a becomes current-carrying and attracts the armature 51. The latter is raised together with the sleeve 52, with the result that the contact 54 snaps in under the wider portion of the sleeve 52 and retains the sleeve in its upper position. At the same time, the contact arm 57 is raised against the action of an elastic force 65 so that the contacts 62, 64 are closed. As a result circuits are closed, on the one hand, via ignition switch 16, wire 45, which is connected to the negative pole of battery 97, heating winding 56 and contact 54 to the earth-connected sleeve 52 and, on the other hand, via wire 45, contacts 64, 62 and wire 63 to the primary circuit of the ignition coil and parallel therewith to the wire 35 inclusive apparatus connected thereto. Simultaneously with the raising of the contact arm 57 a leverage is produced on account of the contact pressure between the members 62, 64 so that the right hand end of the arm 57 is raised from the contact piece 59. After the lapse of a certain time the thermostat member 55 is heated so that the contact 54 is pulled outwards and the sleeve 52 is free to fall down, unless before that time a sufficient oil pressure has been built-up under the membrane 47. However, if the oil pressure is insufficient, the contacts 62, 64 are opened, whereby the primary circuit of the ignition coil is interrupted, and at the same time the right hand end of the contact arm 57 is brought anew into conductive contact with the member 59 so that the magneto 61 is earthed via clamping screw 60, member 59, arm 57, sleeve 52, rod 48, membrane 47 and the body or frame. If the membrane 47 is made of insulating material a special earth connection should be arranged.

As will be seen in Figure 3, the interspace 128 between the upper end of the rod 48 and the overlying cover is a definite fraction of the interspace 127 between the upper side of the armature 51 and the under side of the iron core 126. This causes that the raising of the sleeve 52 by magnetic action from the armature 51 will be of such an extent that the contact 54 can snap in under the wider portion of the sleeve 52, whereas the corresponding raising caused by the membrane 47 is not sufficient to actuate the contact 54.

In the arrangement shown in Figures 4 and 5, the solenoid 7 of Figure 1 has been replaced by a push button 69 adapted to be actuated mechanically or manually. The button may be arranged for various operation. Thus, for example, in the shown embodiment the button is hollow and slidable in a casing 70 and provided on its inside with an annular flange 71 engaging with the inside of said casing. A contact ring 106 is provided on the under side of this flange. The button is normally retained in its upper position shown on the drawings under the influence of a compression spring 72, one end of which rests against the inner bottom surface of the button 69 and the other end against a rod 73. The lower end of said rod 73 is fixed to an insulating plate 74 which forms part of a casing 75 enclosing the ignition coil 98. Slidably mounted on the rod 73 is a sleeve 76 the upper portion of which is slideable within the push button 69 and the lower end of which has downwardly extending lugs 77. At its upper part the sleeve 76 is somewhat thicker and provided with a metallic piece 78 insulated therefrom and having a U-shaped cross-section shown in the figure, and on its diametrically opposed side the sleeve has a further contact piece 79. The lower shank of the contact piece 78 terminates flush with an insulated sliding surface 80 provided on the sleeve. With said surface 80 cooperates a pawl 81 of a bimetallic member 82 the lower end of which is held in position by a flange on the rod 73 in the cover 74 and which is provided with a heating winding 83. One terminal of said winding is connected to the body or frame at 104, whereas its other terminal is connected to the pawl 81. A membrane 84 controlled by the oil pressure cooperates with the one insulated end 85 of a contact arm 87 rocking on a shaft 86. A spring 88 located on the shaft 86 tends to retain the arm 87 in its upper position shown in the figure. The arm 87 is provided with an opening 89 through which the thermostat member 82 and the rod 73 but not the sleeve 76 can pass freely. The upwardly swinging movement of the arm 87 caused by the spring 88 is opposed by the end 85 bearing on the membrane 84. At its right hand end the arm 87 is provided with three upwardly extending lugs 90, 91, 92 which form sliding contacts. These lugs cooperate with correspondingly curved stationary contact bars 93, 94, and 95, respectively. The contact bar 93 is connected, via a wire 96, to the battery 97 across the ignition switch 16. The bar 94 is connected to the primary winding of the ignition coil 98, whereas the appertaining secondary winding via a wire 99 is connected to the distributor 44. The bar 95, see Figure 5, is connected to the petrol gauge 36 and other devices via wires 101 and 102. The contact piece 78 is connected, via a flexible conductor 105, to the contact arm 87. The contact piece 79 is connected, via a wire 100, to a starting relay 103 which controls the main contacts of the starting motor 9 in a manner known per se.

The arrangement operates in the following manner. When the button 69 is depressed against the action of the spring 72, the flange 71 is brought to actuate the upper end of the sleeve 76 so that the contact ring 106 comes into contact with the contact pieces 78 and 79 and the sleeve 76 is pressed downwards, whereby the lugs 77 76 is pressed downwards, whereby the lugs 77 press the contact arm 87 downwards so that the lugs 90, 91, 92 make contact with the bars 93, 94, and 95. At the same time, the pawl 81 snaps in over the contact piece 78 so that the sleeve 76 is locked in its lower position. As a result, the following circuits are closed:

1. From the negative pole of the battery 97 via ignition switch 16, wire 96, bar 93, lug 90, contact arm 87, lug 91, bar 94 and the primary circuit of the ignition coil 98 across the make-and-break contact (not shown) to the body of the vehicle.

2. From the contact arm 87 there is branched off a current path through contact lug 92 and bar 95, wires 101, 102 and to the petrol gauge 36 and other devices.

3. From the contact arm 87 there is branched off a current path via wire 105, contact piece 78, contact ring 106, contact piece 79, wire 100 to the winding of the starting relay 103 and earth, whereby the engine is started.

4. From the contact arm 87 there is branched off a current path via wire 105, contact piece 78, pawl 81 and heating winding 83 to the body at 104.

The winding 83 is heated and, after the lapse of a predetermined period, the pawl 81 is moved out of engagement with the contact piece 78 so that the sleeve 76 is released and the four current paths are opened again, and the arrangement returns to the initial position shown in Figure 4, provided a sufficient oil pressure has not been built-up before that time to the left of the membrane 84, in which case the end 85 retains the arm 87 in its swung-down position and the current paths Nos. 1 and 2 remain closed.

Figure 6 shows the circuit diagram of an embodiment modified in relation to Figure 2, in which embodiment the member 107 is assumed to be actuated mechanically as in Figure 5 but as to its function corresponds to the armature 20 of Figure 2. In this arrangement the primary circuit of the ignition coil, containing the battery 97, starting switch 16, contacts 17, 18, low-tension coil 108 and make-and-break contacts 66, 67 together with appertaining wires has an invariable resistance during the starting-up process as well as during normal operation. The burning of the ignition coil in case of a still-standing engine is prevented by the sinking of the oil pressure, whereby the membrane 5 automatically causes the opening of the contacts 17, 18 and thus precludes the formation of a continuedly closed ignition circuit if the driver forgets to disconnect the ignition lock and the make-and-break contacts are in closed position. Through the present invention it is by this means rendered possible to design the ignition coil without regard to the above-mentioned risk, i. e. all current limiting means hitherto used, such as a series resistance or a high self-resistance of the primary winding, are superfluous. Said circumstance also influences the insulation of the ignition coil. The facts stated above result in that the total resistance of the primary circuit may be reduced relative to the resistance of the devices hitherto used so that the mean value of the primary current in the operation of the engine, and thus the spark effect, becomes considerably higher, which is of particular importance during the starting moment.

According to the invention it is also possible to provide a special series resistance 109 for the primary coil 108, Figure 7. Said resistance 109 is conveniently provided with two short-circuiting terminals 110 and 111 which are arranged to be actuated directly or indirectly by the bi-metallic member 26 upon the action of the latter (see Figure 1). As long as the bimetallic member occupies its outer position and thus rests against the insulation 22, the contacts 110, 111 are open and the resistance 109 in circuit. This state corresponds to normal operation after the termination of the starting period. During the starting period proper, when the pin 27 projects into the groove 24, the bimetallic member 26 occupies its swung-in position and actuates in this case, by means of an insulating knob 112 located thereon, the contacts 110 and 111 so that these are closed and shortcircuit the resistance 109. However, as soon as the bimetallic member 26 has been heated after the lapse of the predetermined starting period, it is bent outwardly, the short-circuit automatically removed and the resistance 109 introduced into the circuit.

In the arrangement shown in Figure 8 and relating to a Diesel engine, 113 is a regulator for the fuel pump, whereas 114 is a rocker arm for transmitting the regulating motion to a rod 115 to which the accelerating member of the pump (not shown) is connected. On account of the action of a spring 116, the rod 115 tends to occupy a position as far to the right on the drawing as possible. The rod 115 is interrupted at 117 and is continued on the other side of the point of interruption by means of a link system 118 known per se. The two abutting ends are designed to form solenoid armatures 119, 120 and are surrounded by a solenoid 121 which is secured to a flange 122 appertaining to the link system. The field winding of the coil 121 is protected, on its inside, by a non-magnetic lining 123. The magnet coil 121 is connected, via a flexible conductor, to the fastening point of the contact arm 25. Said arm 25 forms part of a control arrangement of the kind described in conjunction with Figure 1.

The arrangement operates in the following manner. As long as the arm 25 is current-carrying from the battery 97 and the wire 13 and the contacts 17 and 18, the solenoid 121 maintains the two ends 119 and 120 pressed against one another and the fuel pump carries-on its function to supply the Diesel engine with fuel. If the oil pressure is insufficient during normal operation or after the end of the starting period at the starting of the engine, the contacts 17 and 18 are opened and, as a result, the ends 119 and 120 are de-energized and the interconnection between the parts 118 and 115 interrupted, the fuel pump becomes inoperative through the action of the spring 116 and the engine comes to a standstill.

It is evident that the membrane 5 may be actuated by other fluids under pressure of importance for the engine, besides the lubricating oil. Thus, it can also be imagined that the membrane is controlled by the pressure from the cooling air or the cooling water of the engine.

What is claimed is:

1. A pressure control apparatus comprising a fluid-controlled operating device, a vital member actuated by said device so as to be operative in case of sufficient fluid pressure and inoperative in case of insufficient pressure, an auxiliary device independent of said operating device and adapted to render said vital member operative at the starting moment before the fluid pressure has reached a fixed value, and a timing device controlled by the auxiliary device but independent of the operating device and adapted to hold the vital member operative during a fixed period of time.

2. A pressure control apparatus for engines to be started by an electric starting motor, comprising an electric starting circuit controlling said starting motor, a fluid-controlled operating device, a vital electric circuit controlled by said operating device in response to fluid pressure, an auxiliary device controlled by said starting circuit so as to render said vital circuit operative at the starting moment before fluid pressure has reached a fixed value, and a timing device controlled by said auxiliary device to hold said vital circuit operative during a fixed period of time independently of said operating device.

3. A pressure control apparatus for engines to be started by an electric starting motor, comprising an electric starting circuit controlling said motor, a fluid-controlled operating device, an electric circuit, vital to the operation of the engine, a switch controlling said vital circuit and itself controlled by said operating device in response to fluid pressure, an auxiliary device associated with said starting circuit and controlling said switch so as to render the vital circuit operative when starting the engine before pressure has reached a requisite value, and a timing device controlled by said auxiliary device to hold said switch operative during a fixed period of time independently of said operating device.

4. A pressure control apparatus for engines to be started by an electric starting motor, comprising an electric starting circuit controlling said starting motor, a fluid-controlled operating device, an electric circuit, vital to the operation of the engine, a switch controlling said vital circuit and itself controlled by said operating device in response to fluid pressure, an electromagnetic relay, a field winding of said relay associated with said starting circuit, an armature of said relay controlling said switch so as to render the vital circuit operative when starting the engine before pressure reaches a requisite value, and a timing device controlled by said armature to hold said switch operative during a fixed period of time independently of said operating device.

5. A pressure control apparatus for engines to be started by an electric starting motor, comprising an electric starting circuit controlling said motor, a fluid-controlled membrane, an electric circuit, vital to the operation of the engine, a switch controlling said vital circuit, a solenoid associated with said starting circuit, a rod-shaped member coaxial of said solenoid and slidable in its longitudinal direction and associating said membrane with said switch, an armature of said solenoid controlling said switch in response to the operation of the starting circuit, and a timing device controlled by said armature to hold said switch operative during a fixed period of time independently of said membrane.

6. A pressure control apparatus for engines to be started by an electric starting motor, comprising an electric starting circuit controlling said motor, a fluid-controlled membrane, an electric circuit, vital to the operation of the engine, a switch controlling said vital circuit, a solenoid associated with said starting circuit, a rod-shaped member coaxial of said solenoid and slidable in its longitudinal direction and associating said membrane with said switch, an armature of said solenoid, a sleeve-shaped member associated with said armature and coaxial with said solenoid and slidable in its longitudinal direction relatively to said rod-shaped member and controlling said switch in response to the operation of the starting circuit, and a timing device controlled by said armature to hold said switch operative during a fixed period of time independently of said membrane.

7. A pressure control apparatus for engines to be started by an electric starting motor, comprising an electric starting circuit controlling said motor, a fluid-controlled membrane, an electric circuit, vital to the operation of the engine, a switch controlling said vital circuit, a solenoid associated with said starting circuit, a rod-shaped member coaxial of said solenoid and slidable in its longitudinal direction and associating said membrane with one electrode of said switch, an armature of said solenoid, a sleeve-shaped member associated with said armature and coaxial with said solenoid and slidable in its longitudinal drection relatively to said rod-shaped member and associated with an opposing electrode of said switch, and a timing device controlled by said armature to hold said switch operative during a fixed period of time independently of said membrane.

8. A pressure control apparatus for engines to be started by an electric starting motor, comprising an electric starting motor, comprising an electric starting circuit controlling said motor, a fluid-controlled membrane, an electric circuit, vital to the operation of the engine, a switch controlling said vital circuit, a solenoid associated with said starting circuit so as to be current-carrying when the starting circuit is operative, a rod-shaped member coaxial of said solenoid and slidable in its longitudinal direction and associating said membrane with said switch, an armature of said solenoid controlling said switch in response to the operation of the starting circuit, and a timing device controlled by said armature to hold said switch operative during a fixed period of time independently of said membrane.

9. A pressure control apparatus for engines to be started by an electric starting motor, comprising an electric starting circuit controlling said motor, a fluid-controlled operating device, an electric circuit, vital to the operation of the engine, a switch controlling said vital circuit and itself controlled by said operating device in response to fluid pressure, an auxiliary device associated with said starting circuit and controlling said switch so as to render the vital circuit operative when starting the engine before pressure has reached a requisite value, and a timing device controlled by said auxiliary device to hold said switch operative during a fixed period of time independently of said operating device and a common housing accommodating said operating, auxiliary, and timing devices as well as said switch.

10. A pressure control apparatus comprising a fluid-controlled operating device, a vital member actuated by said device in response to fluid pressure, an auxiliary device independent of said operating device and adapted to render said vital member operative at the starting moment before the fluid pressure has reached a fixed value, and a thermostatically timed locking device controlled by the auxiliary device for holding said vital member operative during a fixed period of time independently of said operating device.

11. A pressure control apparatus for engines to be started by an electric starting motor, comprising an electric starting circuit controlling said motor, a fluid-controlled operating device, a vital electric circuit rendered operative by said operating device, an auxiliary device controlled by said starting circuit so as to render said vital circuit operative at the starting independently of said operating device, and a thermostatically timed locking device controlled by said auxiliary device to hold said vital circuit operative during a fixed period of time independently of said operating device.

12. A pressure control apparatus for engines with electrical high tension ignition and to be started by an electric motor, comprising an electric starting circuit controlling said starting motor, a fluid-controlled operating device, a high tension generating member controlled by said operating device in response to fluid pressure, an auxiliary device controlled by said starting circuit and controlling said generating member so as to render this operative independently of said operating device at the starting moment before fluid pressure has reached a fixed value, and a timing device controlled by said auxiliary device to hold said generating member operative during a fixed period of time independently of said operating device, and a structurally combined casing accommodating said generating member and said operating, auxiliary and timing devices, joined to form a self-contained unit.

13. A pressure control apparatus for engines with electrical high tension ignition and to be started by an electric motor, comprising an electric starting circuit controlling said starting motor, a fluid-controlled operating device, a high tension generating member, a switch governing said generating member and itself controlled by said operating device in response to fluid pressure, an auxiliary device controlled by said starting circuit and controlling said switch so as to render said generating member operative independently of said operating device at the starting moment before fluid pressure has reached a fixed value, and a timing device controlled by said auxiliary device to hold said switch and generating member operative during a fixed period of time independently of said operating device, and a structurally combined casing accommodating said generating member, said switch, and said operating, auxiliary and timing devices, joined to form a self-contained unit.

14. A pressure control apparatus for engines with electrical high tension ignition and to be started by an electric motor, comprising an electric starting circuit controlling said starting motor, a fluid-controlled operating device, a high tension generating member controlled by said operating device in response to fluid pressure, an auxiliary device controlled by said starting circuit and controlling said generating member so as to render this operative independently of said operating device at the starting moment before fluid pressure has reached a fixed value, and a timing device controlled by said auxiliary device to hold said generating member operative during a fixed period of time independently of said operating device, and a structurally combined casing accommodating said generating member and said operating and auxiliary devices, joined to form a self-contained unit.

15. A pressure control apparatus for engines with electrical high tension ignition and to be started by an electric motor, comprising an electric starting circuit controlling said starting motor, a fluid-controlled operating device, a high tension generating member, a switch governing said generating member and itself controlled by said operating device in response to fluid pressure, an auxiliary device controlled by said starting circuit and controlling said switch so as to render said generating member operative independently of said operating device at the starting moment before fluid pressure has reached a fixed value, and a timing device controlled by said auxiliary device to hold said switch and generating member operative during a fixed period of time independently of said operating device, and a structurally combined casing accommodating said generating member, said switch, and said operating and auxiliary devices, joined to form a self-contained unit.

16. A pressure control apparatus for engines having ignition coil with primary and secondary circuits, make-and-break contacts controlling said primary circuit, a fluid, the pressure of which depends on the operation of the engine, a fluid-controlled operating device controlling said primary circuit in response to fluid pressure, an auxiliary device independent of said operating device and adapted to render said primary circuit operative at the starting moment before the fluid pressure has reached a fixed value, a timing device controlled by the auxiliary device but independent of the operating device and adapted to hold the primary circuit operative during a fixed period of time, and a structurally combined casing accommodating said ignition coil and said operating and auxiliary devices, assembled to form a self-contained unit, said primary circuit being adapted on the one hand, to be passed, during the operation of the engine, by a current, the highest instantaneous value of which essentially exceeds the highest permissible value that can be allowed at continuedly closed make-and-break contacts, and on the other hand, to be made current-less automatically under the influence of the operating device when the engine comes to a standstill.

17. A pressure control apparatus for engines having ignition coil with primary and secondary circuits, a change-over switch adapted to control the primary ampere-turns of the coil so that they are comparatively high at starting and comparatively low at normal running, a fluid the pressure of which depends on the operation of the engine, a fluid-controlled operating device controlling said primary circuit in response to fluid pressure, an auxiliary device independent of said operating device and adapted to render said primary circuit operative at the starting moment before the fluid pressure has reached a fixed value, a timing device controlled by the auxiliary device but independent of the operating device and adapted to hold the primary circuit operative during a fixed period of time, and a connection between said change-over switch and said timing device to shift the former simultaneously with the latter.

18. A pressure control apparatus for Diesel engines having supply of fuel as well as pressure-fluids, other than fuel, said apparatus comprising an operating device, responsive to fluid pressure, a fuel feeding device controlled by said operating device so as to be operative in case of sufficient fluid pressure and inoperative in case of insufficient pressure, an auxiliary device independent of said operating device and adapted to render said fuel feeding device operative at the starting moment before fluid-pressure has reached a fixed value, and a timing device controlled by the auxiliary device to hold the fuel feeding device operative during a fixed period of time independently of said operating device.

19. A pressure control apparatus for Diesel engines having supply of fuel as well as pressure-fluids, other than fuel, said apparatus comprising an operating device responsive to fluid pressure, a fuel feeding device, electro-magnetic means governing said feeding device and controlled by said operating device so as to make said feeding device operative in case of sufficient fluid pressure and inoperative in case of insufficient pressure, an auxiliary device independent of said operating device and adapted to render said electro-magnetic means operative at the starting moment before fluid pressure has reached a fixed value, and a timing device controlled by the auxiliary device to hold said electromagnetic means operative during a fixed period of time independently of said operating device.

20. A pressure control apparatus for Diesel engines having supply of fuel as well as pressure-fluids, other than fuel, said apparatus comprising an operating device responsive to fluid pressure, a fuel feeding device, electromagnetic means governing said feeding device and controlled by said operating device so as to make said feeding device operative in case of sufficient fluid pressure and inoperative in case of insufficient pressure, an auxiliary device independent of said operating device and adapted to render said electromagnetic means operative at the starting moment before fluid pressure has reached a fixed value, and a timing device controlled by the auxiliary device to hold said electromagnetic means operative during a fixed period of time independently of said operating device, and a housing accommodating said operating, auxiliary, and timing devices as well as said electromagnetic means.

HEINZ SCHIROKAUER.